United States Patent
Lee

(10) Patent No.: US 10,741,827 B2
(45) Date of Patent: Aug. 11, 2020

(54) METHOD FOR MANUFACTURING ELECTRODE FOR SECONDARY BATTERY SUITABLE FOR HIGH LOADING

(71) Applicant: LG Chem, Ltd., Seoul (KR)

(72) Inventor: Young Hwan Lee, Gyeonggi-do (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 16/341,573

(22) PCT Filed: Feb. 6, 2018

(86) PCT No.: PCT/KR2018/001558
§ 371 (c)(1),
(2) Date: Apr. 12, 2019

(87) PCT Pub. No.: WO2018/159946
PCT Pub. Date: Sep. 7, 2018

(65) Prior Publication Data
US 2019/0379033 A1    Dec. 12, 2019

(30) Foreign Application Priority Data

Mar. 2, 2017 (KR) .................. 10-2017-0027194

(51) Int. Cl.
*H01M 4/04* (2006.01)
*H01M 10/0525* (2010.01)
*H01M 4/02* (2006.01)

(52) U.S. Cl.
CPC ....... *H01M 4/0471* (2013.01); *H01M 4/0404* (2013.01); *H01M 10/0525* (2013.01); *H01M 2004/021* (2013.01)

(58) Field of Classification Search
CPC .......... H01M 4/0404; H01M 2220/20; H01M 2220/00
(Continued)

(56) References Cited

U.S. PATENT DOCUMENTS

| 2,409,295 A | 10/1946 | Marvin et al. |
| 2005/0175901 A1* | 8/2005 | Kawakami ............. H01M 4/40 429/231.95 |

(Continued)

FOREIGN PATENT DOCUMENTS

| EP | 3483951 A1 | 5/2019 |
| JP | 5805568 B1 | 11/2015 |

(Continued)

OTHER PUBLICATIONS

Extended European Search Report for Application No. EP 18761040.7 dated Aug. 21, 2019, pp. 1-5.

(Continued)

*Primary Examiner* — Tabassom Tadayyon Eslami
(74) *Attorney, Agent, or Firm* — Lerner, David, Littenberg, Krumholz & Mentlik, LLP

(57) ABSTRACT

Methods for preparing an electrode for a secondary battery are provided herein. In some embodiments, the method includes coating a current collector with an electrode slurry to form a coating layer on the current collector, the electrode slurry including a binder, an electrode active material, a conductive material, and amorphous selenium nanoparticles, and a solvent; and drying the coating layer, wherein the drying vaporizes the amorphous selenium nanoparticles and forms a passageway in the coating layer.

3 Claims, 1 Drawing Sheet

(58) Field of Classification Search
USPC .............. 136/238; 429/231.1; 427/76, 255.29
See application file for complete search history.

(56) References Cited

U.S. PATENT DOCUMENTS

2008/0292965 A1   11/2008   Kubota et al.
2013/0260240 A1   10/2013   Lee et al.

FOREIGN PATENT DOCUMENTS

| KR | 2008/0103011 A | | 11/2008 |
|----|----------------|---|---------|
| KR | 20090082973 A | | 8/2009 |
| KR | 1115392 B1 | | 2/2012 |
| KR | 20130037245 A | | 4/2013 |
| KR | 20140039592 A | | 4/2014 |
| KR | 20140044527 A | | 4/2014 |
| KR | 20150014800 A | | 2/2015 |
| KR | 1020150014800 | * | 2/2015 |
| KR | 20160037084 A | | 4/2016 |
| KR | 20160118586 A | | 10/2016 |

OTHER PUBLICATIONS

Zhang et al., "Encapsulation of selenium sulfide in double-layered hollow carbon spheres as advanced electrode material for lithium storage", Nano Research, Tsinghua University Press, CN, vol. 9, No. 12, Sep. 7, 2016 (Sep. 7, 2016), pp. 3725-3734, XP036101603.
Search Report from International Application No. PCT/KR2018/001558, dated May 8, 2018.

* cited by examiner

METHOD FOR MANUFACTURING ELECTRODE FOR SECONDARY BATTERY SUITABLE FOR HIGH LOADING

CROSS-REFERENCE TO RELATED APPLICATION(S)

The present application is a national phase entry under 35 U.S.C. § 371 of International Application No. PCT/KR2018/001558, filed on Feb. 6, 2018, which claims priority to Korean Patent Application No. 10-2017-0027194, filed on Mar. 2, 2017, the disclosures of which are incorporated by reference herein.

TECHNICAL FIELD

The present disclosure relates to a method for preparing an electrode for a secondary battery. The method for preparing an electrode for a secondary battery includes coating a current collector with the electrode slurry to form a coating layer on the current collector, the electrode slurry including a binder, an electrode active material, a conductive material, and amorphous selenium nanoparticles, and a solvent; and drying the coating layer to vaporize the amorphous selenium nanoparticles and forms a passageway in the coating layer.

BACKGROUND ART

As the technical development of and the demand for mobile devices have increased, the demand for secondary batteries as an energy source has rapidly increased. Among the secondary batteries, lithium secondary batteries, which have high energy density and discharge voltage, have been carried out much research and commercially available and widely used.

In terms of the shape of batteries, the demand for prismatic secondary batteries or pouch-shaped secondary batteries which are thin enough to be applied to products, such as mobile phones, is very high. However, in terms of the material for batteries, the demand for lithium secondary batteries, such as lithium ion batteries and lithium ion polymer batteries, exhibiting high energy density, discharge voltage, and output stability is very high.

The secondary battery according to its shape can be classified into a cylinder type battery cell, a prismatic type battery cell, and a pouch type battery cell. Among them, the cylinder type secondary battery comprises an electrode assembly, a cylinder type can including the electrode assemble, and a can assembly combined to the top of the can.

In the secondary battery, an electrode assembly installed in the battery case is an electricity generating element, which is composed of stacked structure of a positive electrode, a separator, and a negative electrode and can be charge and discharge. The electrode assembly can be approximately classified into a jelly-roll type, which wound up by interposed a separator between a positive electrode and a negative electrode of a sheet type applied an electrode active material slurry, a stacked type sequentially laminated in the state of a separator interposed between a plurality of positive electrode and negative electrode, and a stacked/folding type wound with unit cells of stacked type to long separated film. Among them, the jelly-roll type electrode assembly has advantages such as it is easy to manufacture and has high energy destiny per unit weight, thereby it is widely used.

The jelly-roll type electrode assembly composed of jelly-roll type wound with a positive electrode, a negative electrode, and a separator interposed between the two electrodes as cylinder type, and a positive electrode tab and a negative electrode tab each drawn from a positive electrode and a negative electrode. Generally, a positive electrode tab drawn to the upper part, and a negative electrode drawn to the lower part.

A can is a container of metal material having nearly cylinder form in cylinder type secondary batteries, and formed by manufacturing method such as deep drawing. Therefore, the can itself can be a terminal.

A cap assembly has a structure in which an upper end cap forming a positive electrode terminal, a PTC element configured to greatly increase a resistance of a battery to cut off a current when temperature inside the battery rises, a safety vent configured to cut off the current or exhaust gas when a pressure inside the battery rises, a gasket configured to electrically isolate the safety vent from a cap plate except for certain portions, and the cap plate to which a positive electrode terminal connected to the positive electrode is connected are sequentially stacked.

The positive electrode of the electrode assembly is electrically connected to one component of the cap assembly through the positive electrode tab which is drawn upward from the positive electrode, and the negative electrode is connected to a bottom surface of the can through the negative electrode tab which is drawn downward from the negative electrode. Of course, the electrode may be designed by changing polarity.

Further, an upper insulation member for insulating between the electrode assembly and the cap assembly is located therebetween, and a lower insulation member for insulating between the electrode assembly and the bottom surface of the can is located therebetween.

Meanwhile, a lithium secondary battery as an electrode active material comprises a positive electrode including lithium transition metal oxide, a negative electrode including a carbon-based active material, and a porous separator. The positive electrode is prepared by coating a positive electrode slurry to an aluminum foil, and the negative electrode is prepared by coating a negative electrode slurry including a carbon-based active material to a copper foil.

The positive electrode slurry and the negative electrode slurry added a conductive material to improve electrical conductivity of an active material. Especially, a lithium transition metal oxide used as a positive active material fundamentally has low electrical conductivity, thereby the positive electrode slurry requisitely added a conductive material.

As the conductive material, carbon-based materials such as graphite such as natural graphite and artificial graphite, carbon black such as carbon black, acetylene black, channel black, furnace black, lamp black, summer black, and the like are mainly used, and in some cases, conductive fibers such as carbon fibers, metal fibers, and the like are used. Specific examples of commercially available conductive materials may include various acetylene black products (available from Chevron Chemical Company), Denka Black (available from Denka Singapore Private Limited), various products available from Gulf Oil Company, Vulcan XC-72 (available from Cabot Company), Super P (Timcal Co., Ltd.), and the like.

As demand for electricity is increasing, batteries are gradually having high capacity and a high loading electrode having high energy density has appeared. In the case of a high loading electrode, compared to a low loading electrode, cycle performance is low as lithium ion delivery to foil in an electrode is very low.

Specifically, in order to increase linearity of lithium ion in a high loading electrode, methods such as increasing porosity in an electrode or mechanically preparing pores in an electrode after manufacturing an electrode have been suggested.

However, in the case of increasing porosity in an electrode, because of increasing in thickness, energy density is decreased, and in the case of preparing pores in an electrode after manufacturing an electrode, local electrode degradation can be happened because of decrease in an electrode active material and artificial form.

DISCLOSURE

Technical Problem

In order to solve the above described problem, the present disclosure provides a method for preparing an electrode having a passageway by adding amorphous selenium nanoparticles to a mixing process of an electrode active material, a conductive material and a binder to prepare the conventional electrode slurry, and vaporizing selenium nanoparticles when the electrode slurry is being applied and dried.

Technical Solution

According to one exemplary embodiment of the present disclosure, there is provided a method for preparing an electrode for a secondary battery including: dispersing or dissolving a binder in a solvent to prepare a binder solution; preparing an electrode slurry by mixing the binder solution with an electrode material including an electrode active material, a conductive material, and amorphous selenium nanoparticles; coating a current collector with the electrode slurry to form a coating layer on the current collector; and drying the coating layer to vaporize the amorphous selenium nanoparticles and form a passageway in the coating layer.

According to another exemplary embodiment of the present disclosure, a size of the amorphous selenium nanoparticles may be in a range of 500 nm to 1000 nm.

According to still another exemplary embodiment of the present disclosure, the amorphous selenium nanoparticles may be vaporized at 90 to 110° C.

According to yet another exemplary embodiment of the present disclosure, the foaming of the coating layer may include forming a passageway in the coating layer.

According to still yet another exemplary embodiment of the present disclosure, there is provided an electrode for a secondary battery manufactured by the above described method.

According to still yet another exemplary embodiment of the present disclosure, there is provided a lithium secondary battery including the electrode.

According to still yet another exemplary embodiment of the present disclosure, the battery may be any one selected from a lithium ion battery, a lithium polymer battery, and a lithium ion polymer battery.

According to still yet another exemplary embodiment of the present disclosure, there is provided a battery pack including at least one of the above described secondary batteries.

According to still yet another exemplary embodiment of the present disclosure, there is provided a device including the battery pack as a power source.

According to still yet another exemplary embodiment of the present disclosure, the device may be any one selected from a mobile phone, a portable computer, a smartphone, a smart pad, a netbook, a wearable electronic device, a light electronic vehicle (LEV), an electric vehicle, a hybrid electric vehicle, a plug-in hybrid electric vehicle, and a power storage device.

Advantageous Effects

A method is provided for preparing an electrode for a secondary battery having a passageway structure. The method for preparing an electrode for a secondary battery includes: dispersing or dissolving a binder in a solvent to prepare a binder solution; preparing an electrode slurry by mixing the binder solution with an electrode material including an electrode active material, a conductive material, and amorphous selenium nanoparticles; coating a current collector with the electrode slurry to form a coating layer on the current collector; and drying the coating layer to vaporize the amorphous selenium nanoparticles and form a passageway in the coating layer.

Further, the present disclosure provides: an electrode which is prepared by the above described method and is suitable for high loading; a secondary battery including the electrode; a battery pack using the secondary battery; and a device using the battery pack.

DETAILED DESCRIPTION OF THE PREFERRED EMBODIMENTS

Hereinafter, preferred embodiments of the present disclosure will be described in detail. Further, the present embodiments are not intended to limit the scope of the present disclosure, but are merely presented as an example, and various modifications are possible to the extent that technological gist is not deviated.

Figure 1A:
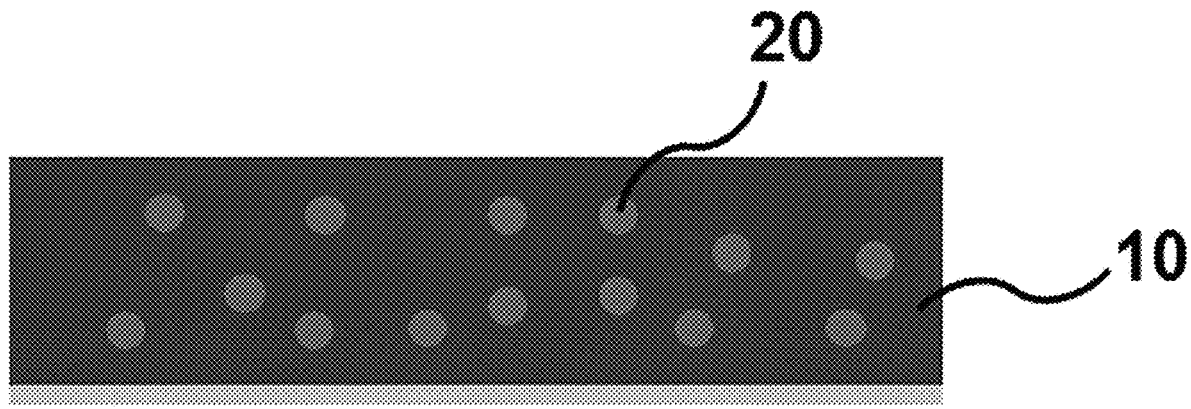
FIG. 1A is a schematic view showing a coating layer prior to drying according to an exemplary embodiment of the present disclosure.
Figure 1B:
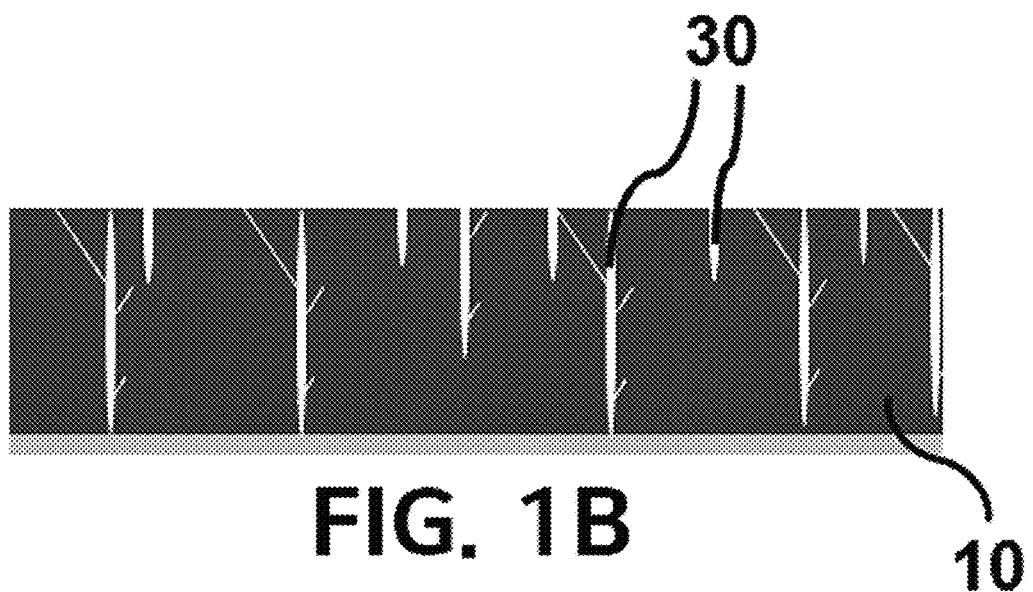
FIG. 1B is schematic view showing a coating layer after drying according to an exemplary embodiment of the present disclosure.

A method for preparing an electrode for a secondary battery of the present disclosure includes dispersing or dissolving a binder in a solvent to prepare a binder solution and preparing an electrode slurry by mixing the binder solution with an electrode material including an electrode active material, a conductive material, and amorphous selenium nanoparticles. As depicted in FIG. 1A, the electrode slurry is coated on a current collector to form a coating layer 10, where the coating layer 10 has amorphous selenium nanoparticles 20 disposed therein. The coating layer is dried to vaporize the amorphous selenium nanoparticles 20 and form a passageway 30 in the coating layer 10 as depicted in FIG. 1B.

Types of the binder, the electrode active material, and the conductive material will be described below together with a secondary battery according to the present disclosure.

According to the present disclosure, a size of the amorphous selenium nanoparticles may be in a range of 500 nm to 1000 nm. The amorphous selenium nanoparticles play a role in forming a passageway while vaporizing. The passageway is intended to enhance lithium ion straightness, and thus amorphous selenium nanoparticles of smaller than 500 nm do not contribute to pass lithium ions, and amorphous selenium nanoparticles having a particle size exceeding 1 nm act like voids so that energy density of the amorphous selenium nanoparticles decreases as a porosity of the electrode increases, which is not preferable.

The binder, the electrode active material, the conductive material, and the amorphous selenium nanoparticles are mixed together to prepare the electrode slurry, and the current collector is coated with the electrode slurry. A thickness of the coating will be described in detail below with the secondary battery according to the present disclosure.

When the coated electrode slurry is dried at 90 to 110° C., the amorphous selenium nanoparticles vaporize to foam the coating layer. Foaming the coating layer means that a passageway is formed in the coating layer. Typical selenium has a high melting point and thus does not vaporize at a temperature of 90 to 110° C. However, the amorphous selenium nanoparticles may vaporize at a temperature of 90 to 110° C. because of being composed of much more disordered particles than crystalline nanoparticles and thus having a weakened intermolecular attraction.

Thus, a temperature lower than 90° C. is not preferable due to the problem in which the amorphous selenium nanoparticles are difficult to vaporize, and a temperature exceeding 110° C. is not preferable either since other compositions in the electrode slurry may also vaporize and thus an electrode structure may be changed.

The secondary battery electrode of the present disclosure prepared by the above described method has a structure suitable for high loading so that the lithium ion straightness is enhanced and the energy density is not decreased.

Meanwhile, the present disclosure provides a secondary battery including the electrode which is prepared in the above described method and suitable for high loading.

The secondary battery according to the present disclosure is configured to accommodate an electrode assembly in which two electrodes of different polarities are laminated in a state of being separated by a separator, and the electrode assembly includes a positive electrode including a positive electrode active material, a negative electrode including a negative electrode active material, and a separator.

Specifically, the positive electrode is prepared, for example, by applying a mixture of a positive electrode active material, a conductive material, and a binder on a positive electrode current collector and then drying the resultant, and a filler may be further added to the mixture as necessary.

According to the present disclosure, the positive electrode active material can use layered compound such as lithium cobalt oxide($LiCoO_2$), lithium nickel oxide($LiNiO_2$), etc. or compound substituted with one or more transition metals; formula $Li_{1+x}Mn_{2-x}O_4$ (wherein, x is 0 to 0.33), lithium manganese oxide($LiMnO_2$) such as $LiMnO_3$, $LiMn_2O_3$, $LiMnO_2$, etc.; lithium copper oxide($Li_2CuO_2$); vanadium oxide such as $LiV_3O_8$, $LiFe_3O_4$, $V_2O_5$, $Cu_2V_2O_7$, etc.; nickel site type lithium nickel oxide expressed as formula $LiNi_{1-x}M_xO_2$ (wherein, M=Co, Mn, Al, Cu, Fe, Mg, B or Ga, x=0.01 to 0.3); lithium manganese composite oxide expressed as formula $LiMn_{2-x}M_xO_2$ (wherein, M=Co, Ni, Fe, Cr, Zn or Ta, x=0.01 to 0.1) or $Li_2Mn_3MO_8$ (wherein, M=Fe, Co, Ni, Cu or Zn), $LiMn_2O_4$ which part of lithium of the formula is substituted with alkaline earth metal ion; disulfide compound; compound having lithium intercalation material as main component such as composite oxides formed by $LiMn_2O_4$ or their combination.

The positive electrode collector is generally prepared by 3 to 500 μm thickness. There is no particular limit as to the positive electrode current collector, so long as it does not cause chemical changes in the fabricated battery and has conductivity. For example, stainless steel, aluminum, nickel, titanium, sintered carbon or an aluminum or stainless steel surface treated with carbon, nickel, titanium or silver can be used. The current collector may form fine irregularities on its surface and can increase adhesion of a positive electrode active material, and it can be in a variety of form such as a film, a sheet, a foil, a net, a porous material, a foam, a non-woven fabric.

The conductive material may be generally added in an amount of 1 to 50 wt % based on the total weight of a mixture including a positive electrode active material. There is no particular limit as to the conductive material, so long as it does not cause chemical changes in the fabricated battery and has conductivity. For example, graphite such as natural or artificial graphite; carbon black such as carbon black, acetylene black, ketjen black, channel black, furnace black, lamp black, and thermal black; conductive fibers such as carbon fiber and metallic fiber; metallic powders such as carbon fluoride powder, aluminum powder, and nickel powder; conductive whiskers such as zinc oxide whiskers and potassium titanate whiskers; conductive metal oxides such as titanium oxide; conductive materials such as polyphenylene derivatives; and etc. may be used.

The binder is a component which supports combination of an active material and a conductive material and combination of a collector, conventionally the binder is added 1 to 50 weight % based on the total mixture weight including a positive electrode active material. Examples of the binder are polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diether polymer (EPDM), sulfonation EPDM, styrene butyrene rubber, fluorine rubber, and various copolymers, etc.

The filler may be optionally used as a component to inhibit positive electrode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber, etc.

In addition, a negative electrode is prepared by coating and drying a negative electrode material on a negative electrode current collector, and components described above may be further included.

The negative electrode current collector may be generally manufactured to 3 to 500 μm thickness. For the negative electrode current collector, a material not inducing the chemical change and having a high conductivity may be used without limitation. Examples of the negative electrode current collector may include copper, stainless steel, aluminum, nickel, titanium, sintered carbon, or an aluminum or stainless steel surface treated with carbon, nickel, titanium or silver. The negative electrode current collector same as the positive electrode current collector may have fine irregularities on the surface thereof to increase adhesion of the negative electrode active material, and may have various forms such as a film, a sheet, a foil, a net, a porous body, a foam, and a non-woven fabric, etc.

As the negative electrode material comprises amorphous carbon or crystalloid carbon such as non-graphitizing carbon or graphite-based carbon; a metal composite oxide, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, 2 and 3 elements of the periodic table, halogen; $0 \leq x \leq 1$; $1 \leq y \leq 3$; $1 \leq z \leq 8$); lithium metal; lithium alloy; silicon-based alloy; tin-based alloy; an oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; conductive polymer such as polyacetylene; or a Li—Co—Ni based material may be used.

For a separator insulating the electrodes between the positive electrode and the negative electrode, a conventional polyolefin-based separator or a composite separator formed an organic and inorganic composite layer on the olefin-based material can be used, and not limited thereto.

The electrolyte may be a non-aqueous electrolyte solution containing a lithium salt, and may include a non-aqueous electrolyte solution and a lithium. Examples of the non-aqueous electrolyte solution may include non-aqueous electrolyte, solid electrolyte, inorganic solid electrolyte, etc.

Examples of the non-aqueous electrolyte are N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy franc, 2-methyl tetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate may be used.

Examples of the organic solid electrolyte solution are polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups may be used.

Examples of the inorganic solid electrolyte solution are nitrides, halides, and sulphates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$ may be used.

The lithium salt is a material that is readily soluble in the above-mentioned non-aqueous electrolyte solution, and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

In addition, in order to improve charge and discharge characteristics and flame retardancy, for example, pyridine, triethyl phosphite, triethanol amine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolytic solution. According to circumstances, in order to impart incombustibility, the non-aqueous electrolytic solution may further include halogen-containing solvents, such as carbon tetrachloride and ethylene trifluoride. Furthermore, in order to improve high-temperature storage characteristics, the non-aqueous electrolytic solution may further include carbon dioxide gas.

The battery is any one selected among a lithium ion battery, a lithium polymer battery, a lithium ion polymer battery. This is classified according to property of electrolyte, and the positive electrode, the negative electrode, and electrolyte solution are described as above.

In addition, the present disclosure provides a battery pack comprising one or more of the secondary battery.

The present disclosure also provides a device including the battery pack. Examples of the device include mobile phones, portable computers, smart phones, smart pads, wearable electronic devices, tablet PCs, netbooks, LEV (Light Electronic Vehicle), electric vehicles, hybrid electric vehicles and power storage devices, and not limited thereto.

Hereinafter, the present disclosure will be described in detail with reference to the following examples. However, the examples provided herein are for illustrating the present disclosure, and the scope of the present disclosure is not limited thereto.

Example 1

Mixed oxyhydroxideMOOH(M=Ni4/15(Mn1/2Ni1/2)8/15Co0.2) was used as a transition metal precursor to prepare a lithium-nickel-manganese-cobalt-based active material, and the mixed oxyhydroxide was mixed with Li2Co3 at a stoichiometric ratio (Li:M=1.02:1), and then the mixture was sintered in air at 900° C. for 10 hours to prepare a lithium mixed transition metal oxide. A positive electrode mixture was prepared by mixing 95.1 wt % of a positive electrode active material obtained by mixing the lithium mixed transition metal compound and Li2CoO2 in a ratio of 20:80 and 0.9 wt % of a porous conductive material having an average particle diameter of 35 nm and a DBP adsorption value of 360 ml/100 g with 2 wt % of polyvinylidene fluoride (PVdF) as a binder, and 2 wt % of 500 nm amorphous selenium nanoparticles and N-methlypyrrolidone (NMP) were added to the prepared positive electrode mixture to prepare a positive electrode mixture slurry. The positive electrode mixture slurry was applied on an aluminum foil as a current collector, followed by drying in a vacuum oven at 100° C. for 2 hours or more to prepare a positive electrode.

Example 2

A positive electrode was prepared in the same manner as in Example 1 except that 750 nm amorphous selenium nanoparticles were used.

Example 3

A positive electrode was prepared in the same manner as in Example 1 except that 1000 nm amorphous selenium nanoparticles were used.

Example 4

A positive electrode was prepared in the same manner as in Example 1 except that 750 nm amorphous selenium nanoparticles were used and dried at 90° C.

Example 5

A positive electrode was prepared in the same manner as in Example 1 except that 750 nm amorphous selenium nanoparticles were used and dried at 110° C.

Comparative Example 1

A positive electrode was prepared in the same manner as in Example 1 except that amorphous selenium nanoparticles were not used.

Electrical conductivity of the positive electrode each prepared in the Example 1 to 5 and Comparative Example 1 is measured, and the result is shown in Table 1.

TABLE 1

| | Electrical Conductivity($\Omega$cm)$^{-1}$ |
|---|---|
| Example 1 | $1.3 \times 10^{-2}$ |
| Example 2 | $1.2 \times 10^{-2}$ |
| Example 3 | $1.1 \times 10^{-2}$ |
| Example 4 | $1.1 \times 10^{-2}$ |
| Example 5 | $1.2 \times 10^{-2}$ |
| Comparative Example 1 | $1.2 \times 10^{-3}$ |

As shown in Table 1, it can be seen that the positive electrodes of Examples 1 to 5 prepared using the positive electrode slurry prepared by mixing the amorphous selenium particles according to the present disclosure have an electric conductivity ten times higher than that of the positive electrode of Comparative Example 1 prepared using the conventional method.

As described above, while the present disclosure has been described with reference to specific embodiments and drawings, the present disclosure is not limited thereto. It may be clear to those skilled in the art that various modifications and alterations may be made without departing from the spirit and scope of the present disclosure and equivalents of the appended claims.

The invention claimed is:

1. A method for preparing an electrode for a secondary battery, comprising:
    coating a current collector with an electrode slurry to form a coating layer on the current collector, the electrode slurry including a binder, an electrode active material, a conductive material, and amorphous selenium nanoparticles, and a solvent; and
    drying the coating layer to vaporize the amorphous selenium nanoparticles and form a passageway in the coating layer.

2. The method for preparing an electrode for a secondary battery of claim 1, wherein a size of the amorphous selenium nanoparticles is in a range of 500 nm to 1000 nm.

3. The method for preparing an electrode for a secondary battery of claim 1, wherein the coating layer is dried at 90 to 110° C.

* * * * *